(12) United States Patent
Dottax et al.

(10) Patent No.: US 9,137,221 B2
(45) Date of Patent: Sep. 15, 2015

(54) METHOD OF EXCHANGING DATA SUCH AS CRYPTOGRAPHIC KEYS BETWEEN A DATA PROCESSING SYSTEM AND AN ELECTRONIC ENTITY SUCH AS A MICROCIRCUIT CARD

(75) Inventors: Emmanuelle Dottax, Paris (FR); Mehdi Ziat, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 1121 days.

(21) Appl. No.: 12/562,519

(22) Filed: Sep. 18, 2009

(65) Prior Publication Data

US 2010/0088518 A1    Apr. 8, 2010

(30) Foreign Application Priority Data

Sep. 19, 2008 (FR) ...................................... 08 56325

(51) Int. Cl.
*H04L 29/06* (2006.01)
*G06Q 20/34* (2012.01)
*G06Q 20/40* (2012.01)
(Continued)

(52) U.S. Cl.
CPC ............ *H04L 63/045* (2013.01); *G06Q 20/341* (2013.01); *G06Q 20/3552* (2013.01); *G06Q 20/3576* (2013.01); *G06Q 20/4097* (2013.01); *G07F 7/1008* (2013.01); *H04L 9/3247* (2013.01); *H04L 9/3263* (2013.01); *H04L 63/0823* (2013.01); *H04L 63/12* (2013.01); *H04L 2209/805* (2013.01)

(58) Field of Classification Search
CPC ............ H04L 63/0442; H04L 63/0823; H04L 9/0825; G06Q 20/367

USPC ................................................... 713/175, 155
See application file for complete search history.

(56) References Cited

U.S. PATENT DOCUMENTS

| | | | |
|---|---|---|---|
| 4,935,962 A * | 6/1990 | Austin | 713/159 |
| 5,297,206 A * | 3/1994 | Orton | 380/30 |
| 6,005,942 A | 12/1999 | Chan et al. | |

(Continued)

FOREIGN PATENT DOCUMENTS

| | | |
|---|---|---|
| WO | 2005076204 A | 8/2005 |
| WO | 2007105104 A | 9/2007 |

OTHER PUBLICATIONS

European Search Report, Jan. 20, 2010, EP09170704.

(Continued)

*Primary Examiner* — Syed Zaidi
(74) *Attorney, Agent, or Firm* — Young & Thompson (57) ABSTRACT

A method of exchanging data between a data processing system and an electronic entity, characterized by the following steps:
the electronic entity sending the data processing system a certificate (CASD_CERT) associating an identifier of the electronic entity with a public key (CASD_PK) associated with a secret key (CASD_SK) stored in the electronic entity in a set of reserved keys associated with a first security domain;
the data processing system verifying the association of the identifier and the public key (CASD_PK) via the certificate (CASD_CERT); and
an application of the electronic entity separate from the first security domain and the data processing system exchanging data encrypted by the public key (CASD_PK) or signed by the first security domain by the secret key (CASD_SK) stored in the electronic entity.

19 Claims, 5 Drawing Sheets

(51) Int. Cl.
*G07F 7/10* (2006.01)
*H04L 9/32* (2006.01)

(56) References Cited

U.S. PATENT DOCUMENTS 6,367,011 B1 * 4/2002 Lee et al. .................. 713/172
2004/0030887 A1 * 2/2004 Harrisville-Wolff et al. . 713/155
2009/0307140 A1 * 12/2009 Mardikar .................... 705/71

OTHER PUBLICATIONS

Anonymous: "Public Key Infrastructure and Applications" http://netsec.iseca .org/, [Online] Sep. 6, 2004, XP002534271 Extrait de l'Internet: URL:http://netsec.iseca.org/materials/presentations/PKI_Applications.ppt> [extrait le Jun. 25, 2009] * le document en entier *.

Anonymous : "Index of /materials/presentations" Directory Listing, [Online] XP002534272 Extrait de l'Internet: URL:http://netsec.iseca.org/materials/presentations/ > [extrait le Jun. 25, 2009] for dating XP002534271.

"Chapter 8: Public-Key Encryption Ed Menezes A; Oorschot Van P; Vanstone S" Handbook of Applied Cryptography; [CRC Press Series on Discrete Mathematics and Its Applications], CRC Press, Boca Raton, FL, US , [Online] Oct. 1, 1996, pp. 283-319, XP001525008 ISBN: 978-0-8493-8523-0 Extrait de l'Internet: URL:http ://www.cacr .math.uwaterloo.ca/hac/> Section 8.1.

"Chapter 12: Key Establishment Protocols Ed—Menezes A; Oorschot Van P; Vanstone S" Handbook of Applied Cryptography; [CRC Press Series on Discrete Mathematices and Its Applications], CRC Press, Boca Raton , FL, US, [Online] Oct. 1, 1996, pp. 489-541, XP001525012 ISBN: 978-0-8493-8523-0 Extrait de l'Internet: URL:http://www.cacr.math .uwaterloo.ca/hac/> Section 12.5.

"Chapter 13: Key Management Techniques Ed—Menezes A; Oorschot Van P; Vanstone S" Handbook of Applied Cryptography; [CRC Press Series on Discrete Mathematices and Its Applications], CRC Press, Boca Raton, FL, US, [Online] Oct. 1, 1996, pp. 543-590, XP001525013 ISBN: 978-0-8493-8523-0 Extrait de l'Internet: URL:http://www.cacr.math.uwaterloo.ca/hac/> Section 13.4.2.

French Priority Search Report dated Jun. 26, 2009.

* cited by examiner

METHOD OF EXCHANGING DATA SUCH AS CRYPTOGRAPHIC KEYS BETWEEN A DATA PROCESSING SYSTEM AND AN ELECTRONIC ENTITY SUCH AS A MICROCIRCUIT CARD

BACKGROUND OF THE INVENTION

1. Field of the Invention

The present invention concerns methods of exchanging data (for example cryptographic keys) between a data processing system, for example an application provider, and an electronic entity (generally a secure electronic entity), such as a microcircuit card.

2. Description of the Related Art

It is well known to use cryptographic keys to secure exchanges between two parties, for example by using one or more cryptographic keys to encrypt messages to be exchanged.

In this context, it is naturally necessary to effect beforehand preparatory steps that enable each of the parties (and only the parties) to encrypt and decrypt messages that they exchange.

One solution for this is that a party (for example a service or application provider) seeking to communicate securely with another party (for example a user of the service or the application) physically sends that party an electronic entity (for example of microcircuit card type) storing the necessary cryptographic keys, which are then used to effect the secure communication.

Necessitating the physical sending of the electronic entity, this solution is naturally somewhat impractical. It would in fact be desirable to be able to exchange the cryptographic keys at a distance (for example to set up secure communication with a new application provider on an electronic entity already held by the user).

In this search for security, in order to make the communication between the two parties as secure as possible without involving a third party organization it is nevertheless desirable to effect this exchange of cryptographic keys without recourse to any security system provided by the network used for the remote communication.

SUMMARY OF THE INVENTION

In this context, the invention proposes a method of exchanging data between a data processing system and an electronic entity, characterized by the following steps:
  the electronic entity sending the data processing system a certificate associating an identifier of the electronic entity with a public key associated with a secret key stored in the electronic entity in a set of reserved keys associated with a first security domain;
  the data processing system verifying the association of said identifier and said public key by means of the certificate;
  an application of the electronic entity separate from the first security domain and the data processing system exchanging data encrypted by means of said public key or signed by the first security domain by means of the secret key stored in the electronic entity.

The (public or secret) key used in the exchange (respectively for encryption or signing) is thus certified as being that associated with the electronic entity designated by the identifier without the secret key used being known to any application other than the first security domain.

According to a first possibility, exchanging data includes the data processing system sending said application data encrypted by means of said public key associated with the secret key stored in the electronic entity and signed by means of a secret key of the data processing system.

In this case, there can be a step of decrypting data encrypted by the first security domain having exclusive access to the secret key stored in the electronic entity.

According to a second possibility, exchanging data includes said application sending the data processing system data encrypted by means of a public key of the data processing system and signed by the first security domain by means of the secret key stored in the electronic entity.

The first security domain is executed by the electronic entity and has exclusive access to the secret key stored in the electronic entity.

The following steps can then also be envisaged:
  the data processing system sending the electronic entity a certificate of the system associating an identifier associated with the data processing system with the public key of the data processing system;
  the electronic entity verifying by means of the certificate of the system the association of the identifier associated with the data processing system and the public key of the data processing system.

The certificate associating the identifier of the electronic entity with the public key associated with the secret key stored in the electronic entity can be sent by the first security domain.

The data consists for example of cryptographic keys to be used during exchange of data between the data processing system and the electronic entity secured by at least one of said cryptographic keys.

The electronic entity is a microcircuit card, for example. It can in particular be a mobile telephone network identification card, such as a SIM or USIM card.

Said application is for example a second security domain, distinct from the first security domain, as already indicated.

Thus the invention also proposes a method executed in an electronic entity in order to exchange data with a data processing system, characterized by the following steps:
  sending the data processing system a certificate associating an identifier of the electronic entity with a public key associated with a secret key stored in the electronic entity from a set of reserved keys associated with a first security domain; and
  an application of the electronic entity separate from the first security domain and the data processing system exchanging data respectively encrypted by means of said public key or signed by the first security domain using the secret key stored in the electronic entity.

The invention finally proposes a method executed in a data processing system in order to exchange data with an electronic entity, characterized by the following steps:
  receiving from the electronic entity a certificate associating an identifier of the electronic entity with a public key associated with a secret key stored in the electronic entity from a set of reserved keys associated with a first security domain;
  verifying by means of the certificate the association of said identifier and the public key; and
  an application of the electronic entity separate from the first security domain and the data processing system exchanging data respectively encrypted by means of said public key or signed by the first security domain using the secret key stored in the electronic entity.

BRIEF DESCRIPTION OF THE DRAWING FIGURES

Other features and advantages of the invention will become more apparent in the light of the following description, given with reference to the appended drawings, in which.

DETAILED DESCRIPTION OF THE INVENTION

As will emerge from the following description, the invention is aimed at the exchange of cryptographic keys between an electronic entity 2 (in the present example a microcircuit card) and a data processing system 12 offering a service (by implementing an application) to the user who is the holder of the microcircuit card.

Figure 1:
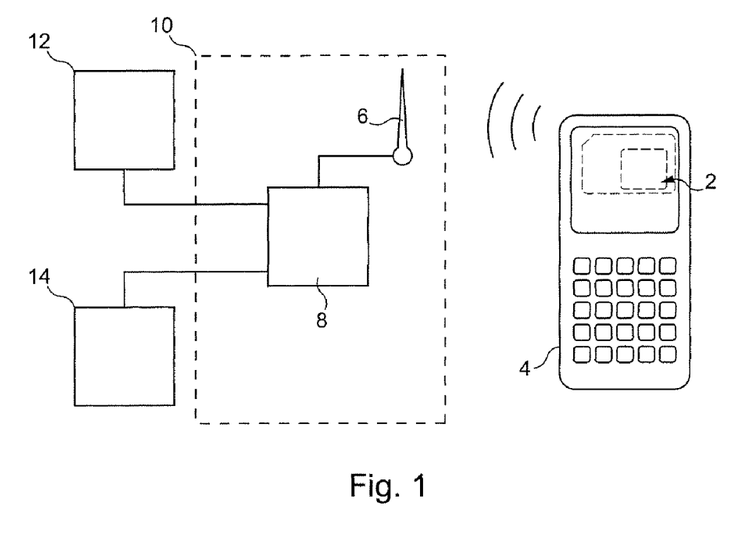
FIG. 1 represents a context of implementation of the invention.

In the context represented by way of example in FIG. 1, the microcircuit card 2 is received in a cellular telephone 4 that can exchange data with external devices (in particular the data processing system 12) using the infrastructure of a mobile telephone network 10 deployed by an operator.

Exchanges of data between the cellular telephone 4 and the external devices 12, 14 use in particular a base station 6 and other equipment 8 of the operator enabling for example connection to other networks, such as the Internet network, to which the data processing system 12 is for example connected.

A controlling authority 14 can also enter into communication with the cellular telephone 4 and the data processing system 12, for example (but not necessarily) via the communication network 10.

This communication network 10 enables secure exchange of data between the various devices.

The service provider that manages the data processing system 12 is for example a bank seeking to be able to exchange data securely between its data processing system 12 and the system formed by the cellular telephone 4 and the microcircuit card 2, and to this end seeking to exchange cryptographic keys with the microcircuit card 2 in a secure manner and independently of the security mechanisms of the communication network 10.

Figure 2:
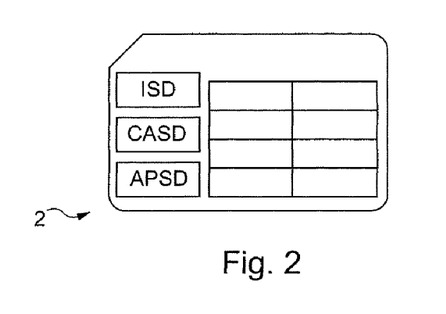
FIG. 2 represents an electronic entity produced in accordance with the teachings of the invention.

As represented in FIG. 2, the microcircuit card 2 is equipped with a microprocessor adapted to execute an application stored (for example in applet form) in a non-volatile memory of the microcircuit card 2 (for example the non-volatile memory included in the microcircuit of the card), including an application ISD supplied by the issuer of the card (in general associated with the operator of the telecommunication network 10), an application CASD associated with the controlling authority 14, and one or more applications APSD each associated with a service provider. These applications, which are adapted to execute secure exchange of messages and to manage the data stored in the microcircuit card, are sometimes called security domains.

The system (in particular the operating system of the card or the virtual machine and its components) is designed so that the security domain application has exclusive (or reserved) access to secure data (in particular cryptographic keys) that other applications cannot access.

It will nevertheless be noted that, although the other applications cannot access this secure data, they can use it via an application of the security domain concerned.

Each security domain is established in the name of an entity external to the card, which can represent the issuer of the card, an application provider or a controlling authority, in particular if these entities require their own security services that are independent of each other.

The security domains offer the applications in the card and external entities security services such as key management, encryption, decryption and generation and verification of signatures.

Each security domain is associated with a set of cryptographic keys which cannot be accessed directly by any entity other than the security domain itself. This mechanism enables a number of independent providers to offer services ensuring that no provider can access the cryptographic keys of another provider.

The application ISD in the microcircuit card that represents the operator is in particular responsible for installing and instantiating the applications APSD.

The application CASD is used to verify certificates and encrypt data, as indicated hereinafter.

Each of the applications APSD enables secure exchanges with external devices by means of a channel secured by a set of cryptographic keys placed in the microcircuit card during a personalization phase described in detail hereinafter, without recourse to the security mechanisms of the telecommunication network 10.

There is described next with reference to FIGS. 3 to 6 a first example of a method of exchanging cryptographic keys conforming to the teachings of the invention.

Figure 3:
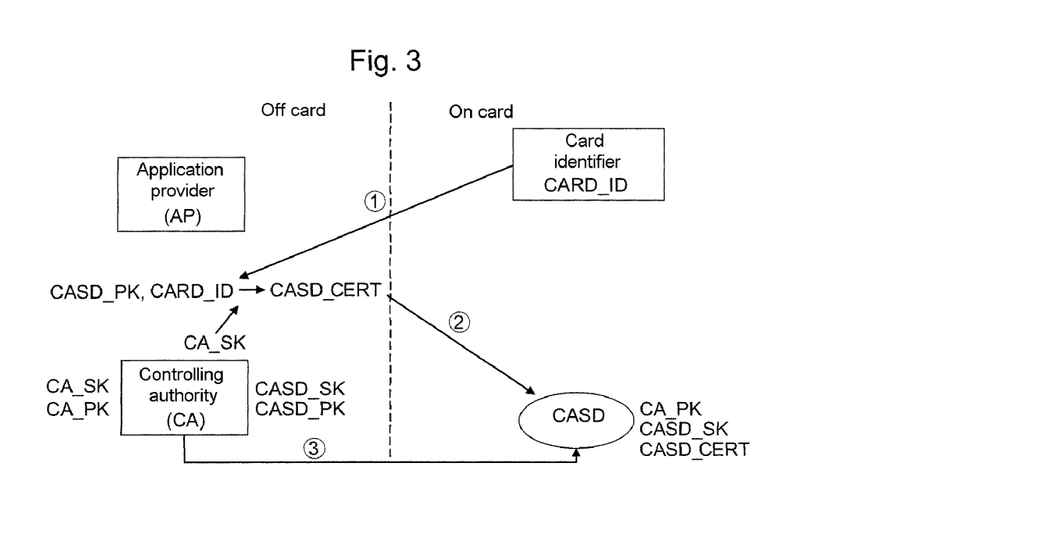
FIGS. 3 to 6 represent the principal steps of a first example of a method conforming to the teachings of the invention.

The general first step consists in storing (arrows 2 and 3) in the microcircuit card, for example during a personalization phase at a personalization center using Store Data commands:
- the secret key of a pair of asymmetrical keys assigned to the application CASD in the microcircuit card;
- the public key CASD_PK of that same pair of asymmetrical keys;
- the certificate CASD_CERT linking that public key to an identifier of the microcircuit card;
- the public key CA_PK of the controlling authority CA;
- where applicable, the set of keys CASD_KeySet relating to the secure communication channel that the application CASD in the microcircuit card can set up.

The certificate linking the public key CASD_PK to the identifier CARD_ID of the microcircuit card is generated beforehand by a controlling authority (CA): the certificate contains the identifier of the microcircuit card (i.e. data that uniquely identifies the microcircuit card, for example by means of a reference number of the card and reference data from the issuer of the card) and the public key CASD_PK, and is signed by the controlling authority CA using its secret key CA_SK.

To this end, the identifier CARD_ID is for example sent by the microcircuit card (arrow 1) during its personalization by means of a Get Data type command.

The keys referred to hereinabove can be generated in the personalization center before they are stored if the controlling authority is also the manufacturer of the microcircuit card. If not, the controlling authority supplies these keys to the manufacturer of the card or gives that manufacturer the means necessary to generate them.

Figure 4:
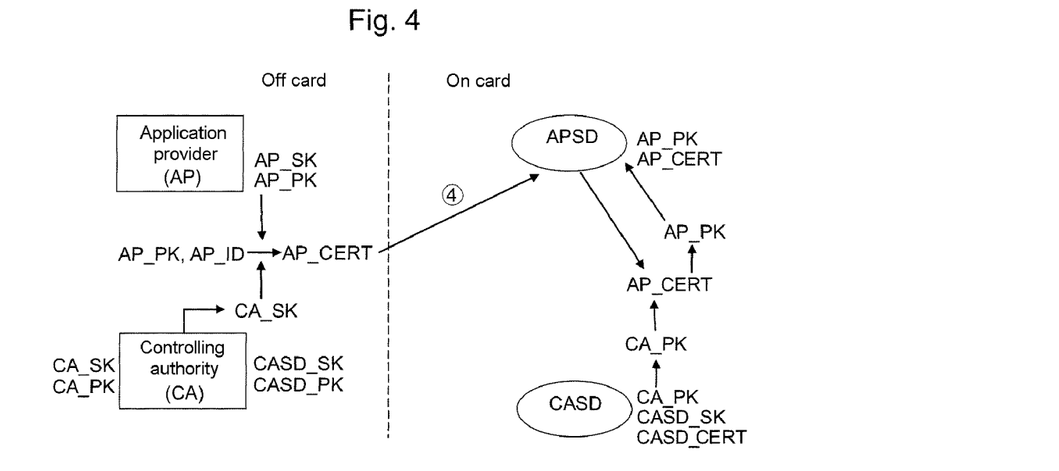

The second principal step of the method is described next with reference to FIG. 4.

During use of the card, if the application (or service) provider AP is seeking to exchange cryptographic keys with the microcircuit card (for example in order to use those cryptographic keys to secure application provider AP-microcircuit card exchanges in the context of the provision of service), the data processing system 12 of the service provider prompts the operator 8 to send a command to its application ISD in the microcircuit card in order to launch instantiation of the application APSD associated with the requesting application provider AP, for example by executing an executable file stored in non-volatile memory of the microcircuit card.

The data processing system 12 of the service provider then transmits (arrow 4) to its application APSD its certificate AP_CERT linking an identifier of the service provider AP_ID and the public key AP_PK of a pair of asymmetrical keys of which the secret key AP_SK is known only to the service provider AP. The certificate AP_CERT and the public key AP_PK are for example stored by means of a Store Data type command.

The certificate AP_CERT of the service provider comprises the public key AP_PK and the identifier AP_ID of the service provider and is signed by means of the secret key CA_SK of the controlling authority CA.

The application APSD then calls the application CASD (by means of exchanges within the microcircuit card 2), which application knows the public key CA_PK of the controlling authority CA, in order to verify the certificate AP-CERT of the service provider: the application CASD verifies by means of the public key CA_PK the signature of the controlling authority (applied using the secret key CA_SK associated with the public key CA_PK), which, in the event of positive verification, confirms that the public key AP_PK is indeed that of the service provider (identified by AP_ID) and that the controlling authority CA has authorized the service provider AP to install applications in the microcircuit card: this authentication of the service provider enables subsequent safe use of the public key AP_PK to encrypt messages intended for the service provider AP or to verify the signature of data emanating from the service provider AP.

The application CASD is kept informed of certificates that are null and void.

Figure 5:
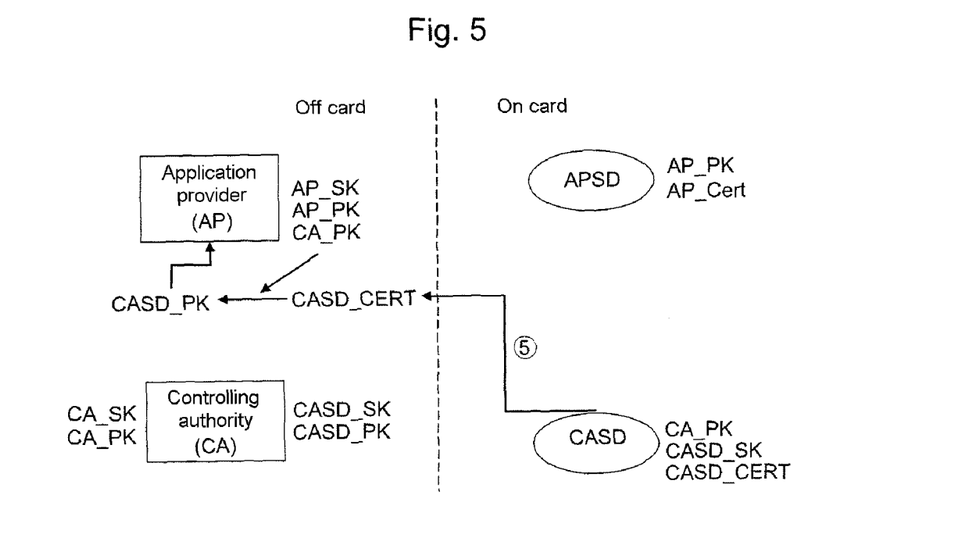

During a third principal step of the method shown in FIG. 5, the application CASD sends the data processing system 12 of the service provider the certificate CASD_CERT linking the public key CASD_PK and the identifier CARD_ID of the microcircuit card. A command of the Get Data type is used, for example (arrow 5).

Using the certificate CASD_CERT and the public key CA_PK of the controlling authority CA (which is naturally available to all), the service provider AP verifies the signature of the certificate CASD_CERT by the controlling authority CA (signature applied as already indicated using the secret key CA_SK of the controlling authority CA), and thus obtains the public key CASD_PK with the assurance that this public key CASD_PK is that associated with the secret key CASD_SK stored in the microcircuit card identified by the identifier CARD_ID. Via its data processing system 12, the service provider AP can thus reliably encrypt data intended for the microcircuit card (and in particular the application APSD installed on that card) using the public key CASD_PK or use the same public key CASD_PK to verify the signature applied using the secret key CASD_SK with the assurance that that signature was applied by the identified microcircuit card.

Figure 6:
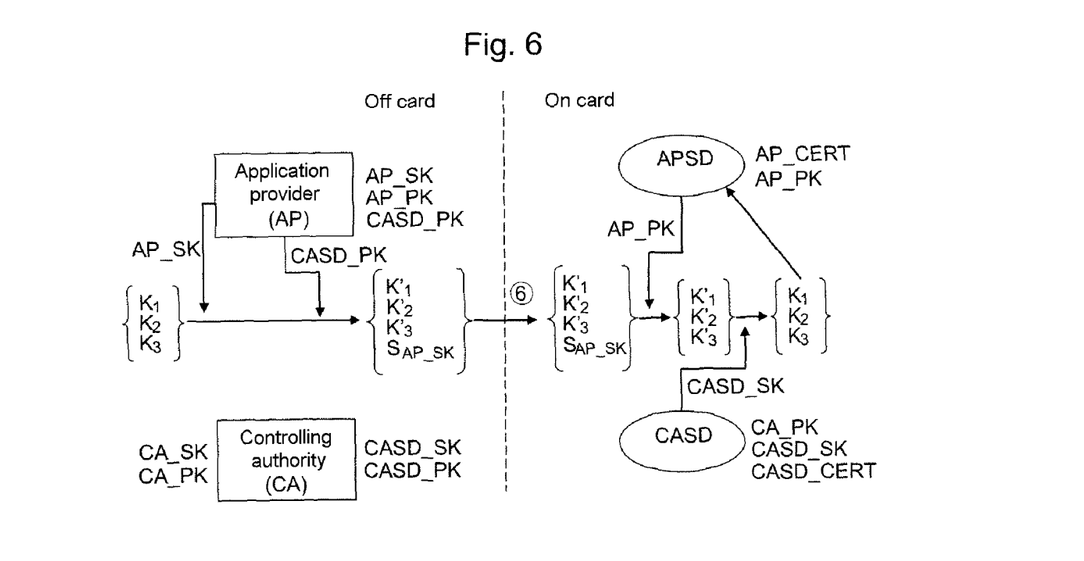

During a fourth principal step of the method shown in FIG. 6, the data processing system 12 of the service provider AP uses its secret key AP_SK to sign the set of cryptographic keys $K_1$, $K_2$, $K_3$ to be sent to the microcircuit card 2 and encrypts the set of keys $K_1$, $K_2$, $K_3$ using the public key CASD_PK of the microcircuit card.

The set of encrypted keys $K'_1$, $K'_2$, $K'_3$ is then sent with the signature $S_{AP\_SK}$ to the microcircuit card (arrow 6, FIG. 6), for example by means of a Store Data type command.

The application APSD that is in communication with the data processing system 12 of the service provider AP thus receives the encrypted and signed set of keys and transmits it within the microcircuit card to the application CASD in order for the latter application to decrypt the keys of the set of keys $K'_1$, $K'_2$, $K'_3$ using its secret key CASD_SK.

The set of keys decrypted by the application CASD is returned (still within the microcircuit card) to the application APSD.

The application APSD also verifies the signature $S_{AP\_SK}$ (previously applied by applying the secret key AP_SK of the service provider) using the public key AP_PK of the service provider AP, the source of which was certified during the second step of the method as indicated above.

In the event of positive verification of the signature and after decryption of the set of keys by the application CASD, the application APSD stores the set of keys $K_1$, $K_2$, $K_3$ in non-volatile memory for future use, in particular for setting up a secure communication channel between the data processing system 12 of the service provider AP and the application APSD hosted by the microcircuit card 2.

Of the applications that can be envisaged, these secure exchanges of data can for example be used to load a payment application with the object of enabling secure payments using the cellular telephone 4 containing the microcircuit card 2, for example by exchange with a reader put in place by the service provider AP over a short range communication interface (possibly of NFC type).

Personalization of the microcircuit card (i.e. storage of the cryptographic keys received from the service provider AP) is thus effected in a secure manner with authentication of the parties to the exchange (service provider AP and microcircuit card 2) thanks in particular to the presence of the application CASD in the microcircuit card, without the cryptographic keys having been accessible to any third party, including the operator, via the application ISD in the microcircuit card.

In the embodiment described here, the set of cryptographic keys consists of three keys $K_1$, $K_2$, $K_3$ that are respectively a symmetrical key used for mutual authentication of the parties, a symmetrical key used to protect the confidentiality of exchanges (by encryption and decryption), and a symmetrical key used to protect the integrity of exchanges (by generating and verifying message authentication codes (MAC)). This is the key set of the security domain for secure messaging.

Figure 7:
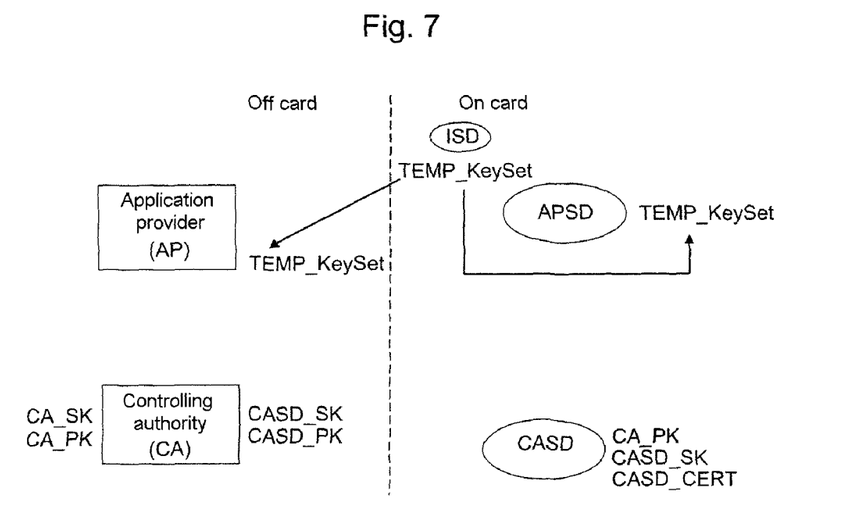
FIGS. 7 to 9 represent some steps of a second example of a method conforming to the teachings of the invention.

A second example of a method conforming to the teachings of the invention for exchanging cryptographic keys is described next with reference to FIGS. 7 to 9.

The first principal step of this method consists in personalizing a microcircuit card in an identical manner to the first example, as described with reference to FIG. 3.

The second principal step of this second example is described next with reference to FIG. 7.

In this second step the operator, at the request of the application provider AP, for example by sending a command to the microcircuit card, requests the application ISD (that the operator manages) to instantiate (i.e. to launch execution of) the application APSD associated with that application provider AP.

In the present embodiment, the operator also requests the application ISD to personalize the application APSD with a temporary key set TEMP_KeySet for example generated and supplied by the application provider AP (i.e. to store in the microcircuit card this temporary key set so that it can be used by the application APSD). Alternatively, it could be the operator who supplies this temporary key set TEMP_KeySet to the data processing system 12 of the application provider AP.

The application provider AP (to be precise its data processing system 12) and the application APSD executed in the microcircuit card thus share a common temporary key set that enables secure exchanges between these two entities using symmetrical cryptography techniques.

Figure 8:
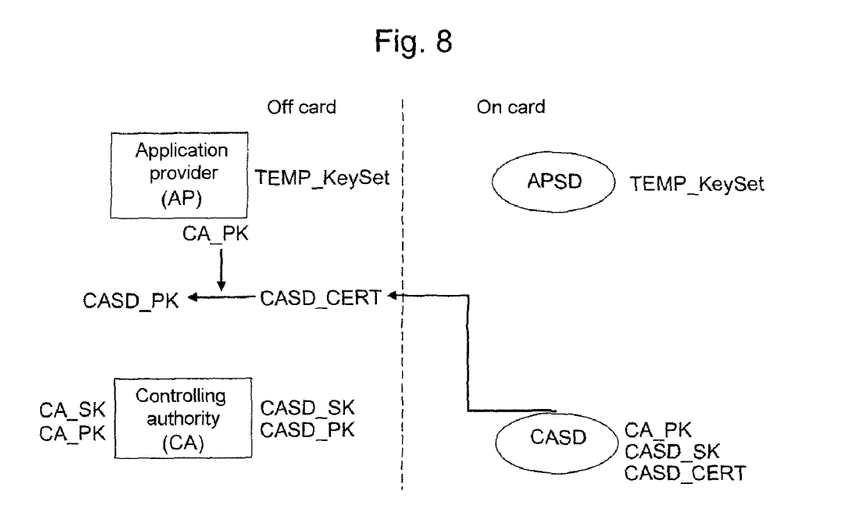

The third principal step of this second example is shown in FIG. 8.

Although in a different context, this step uses the same mechanisms as the third step of the first example described with reference to FIG. 5 and is therefore not described.

Figure 9:
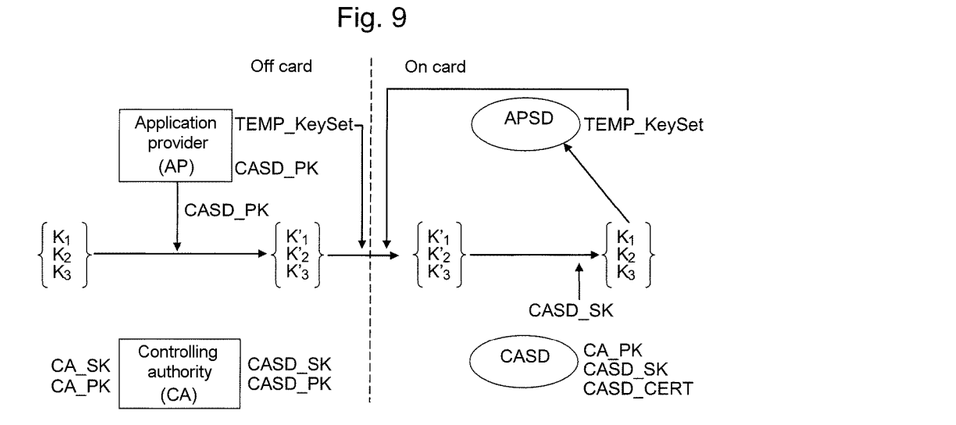

The fourth principal step of this second example is represented in FIG. 9.

In this fourth step, the application provider AP (in practice its data processing system 12) encrypts the set of keys $K_1$, $K_2$, $K_3$ to be sent to the application APSD using the public key CASD_PK of the microcircuit card (i.e. the public key of the asymmetrical pair the private key CASD_SK of which is stored in the microcircuit card).

The encrypted keys $K'_1$, $K'_2$, $K'_3$ are then sent within the microcircuit card to the application APSD, secured by means of the temporary key set TEMP_KeySet.

The application APSD thus receives the encrypted keys $K'_1$, $K'_2$, $K'_3$ via the link made secure by means of the temporary key set TEMP_KeySet that this application holds.

Note that this application APSD thus uses in this solution only symmetrical cryptography (and thus has no recourse to asymmetrical cryptography).

The application APSD then calls the application CASD within the microcircuit card in order for the application CASD to decrypt the set of encrypted keys $K'_1$, $K'_2$, $K'_3$ using the secret key CASD_SK.

The set of decrypted keys $K_1$, $K_2$, $K_3$ is then sent to the application APSD which stores these cryptographic keys (enabling this application to be personalized), with a view to their use for making secure exchanges between the application APSD in the card and applications implemented by the application provider AP outside the card.

Note that the solution that has just been proposed uses the security mechanisms of the operator (by way of the application ISD) to secure the messages exchanged, which guarantees their integrity, but that the data sent is encrypted by means of the public key CASD_PK of the card and is thus inaccessible to the operator or to the application ISD.

Figure 10:
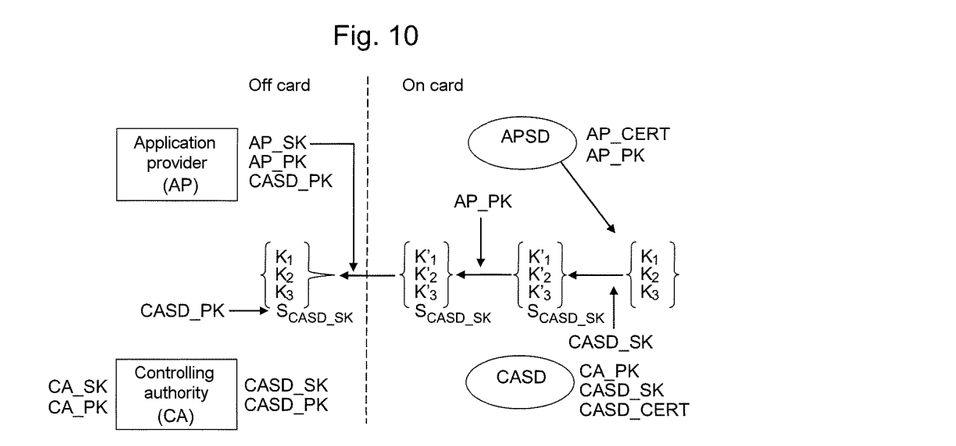
FIG. 10 represents one step of a third example of a method conforming to the teachings of the invention.

A third example of a method conforming to the teachings of the invention of exchanging cryptographic keys is described next with reference to FIG. 10.

The first three principal steps of this method are identical to those of the first example described with reference to FIGS. 3 to 5, respectively.

In this third example, the fourth principal step begins with the generation of the set of cryptographic keys $K_1$, $K_2$, $K_3$ within the microcircuit card by means of the application APSD (for example at the request of the application provider AP).

The set of cryptographic keys $K_1$, $K_2$, $K_3$ is then sent to the application CASD for signing by means of the secret key CASD_SK.

The set of cryptographic keys $K_1$, $K_2$, $K_3$ is moreover encrypted by means of the public key AP_PK of the application provider in order to obtain a set of encrypted keys $K'_1$, $K'_2$, $K'_3$.

The set of encrypted keys $K'_1$, $K'_2$, $K'_3$ and the signature $S_{CASD\_SK}$ are sent to the data processing system 12 of the application provider AP, which on the one hand decrypts the set of encrypted keys $K'_1$, $K'_2$, $K'_3$ using its secret key AP_SK, which retrieves the keys $K_1$, $K_2$, $K_3$ previously generated by the application APSD, and on the other hand verifies the signature $S_{CASD\_SK}$ by means of the public key CASD_PK previously certified as belonging to the microcircuit card identified by the identifier CARD_ID.

If the signature is verified correctly, the application provider AP then uses the cryptographic keys $K_1$, $K_2$, $K_3$ to effect secure exchanges with the application APSD.

The foregoing embodiments are merely possible examples of the implementation of the invention, which is not limited to them.

The invention claimed is:

1. A method of exchanging data between a data processing system and an electronic entity, comprising:
   personalizing by storing in the electronic memory a secret asymmetrical key of a pair of asymmetrical keys;
   the electronic entity sending the data processing system a certificate associating an identifier of the electronic entity with a public asymmetrical key associated with the secret asymmetrical key stored in the electronic entity in a set of reserved keys associated with a first security domain;
   the data processing system verifying the association of said identifier and said public asymmetrical key by means of the certificate;
   an application of the electronic entity separate from the first security domain and the data processing system exchanging data comprising a plurality of symmetric keys encrypted by means of said public asymmetrical key or signed by the first security domain by means of the secret asymmetrical key stored in the electronic entity to produce encrypted keys, the application receiving the encrypted keys by means of a temporary key set such that the application uses only symmetrical cryptography and thus has no recourse to asymmetrical cryptography; and
   the secret asymmetrical key decrypting the plurality of symmetric keys and sending the decrypted plurality of symmetric keys to the application to enable personalization of the application.

2. The method according to claim 1, wherein exchanging data includes the data processing system sending said application data encrypted by means of said public asymmetrical key associated with the secret asymmetrical key stored in the electronic entity and signed by means of a secret key of the data processing system.

3. The method according to claim 2, wherein the first security domain has exclusive access to the secret asymmetrical key stored in the electronic entity.

4. The method according to claim 2, wherein the certificate associating the identifier of the electronic entity with the public asymmetrical key associated with the secret asymmetrical key stored in the electronic entity is sent by the first security domain.

5. The method according to claim 2, wherein the data consists of cryptographic keys.

6. The method according to claim 2, wherein the electronic entity is a microcircuit card.

7. The method according to claim 2, wherein said application is a second security domain.

8. The method according to claim 1, wherein exchanging data includes said application sending the data processing system data encrypted by means of a public key of the data processing system and signed by the first security domain.

9. The method according to claim 8, including the following steps:
   the data processing system sending the electronic entity a certificate of the data processing system associating an identifier associated with the data processing system with the public key of the data processing system;
   the electronic entity verifying by means of the certificate of the data processing system the association of the identifier associated with the data processing system and the public key of the data processing system.

10. The method according to claim 1, wherein the certificate associating the identifier of the electronic entity with the public asymmetrical key associated with the secret asymmetrical key stored in the electronic entity is sent by the first security domain.

11. The method according to claim 1, wherein the data consists of cryptographic keys.

12. The method according to claim 11, including a step of exchanging data between the data processing system and the electronic entity secured by at least one of said cryptographic keys.

13. The method according to claim 1, wherein the electronic entity is a microcircuit card.

14. The method according to claim 1, wherein said application is a second security domain.

15. The method according to claim 1, further comprising:
mutual authentication utilizing a first symmetrical key;
protecting confidentiality of exchanges utilizing a second symmetrical key; and
protecting integrity of exchanges utilizing a third symmetrical key.

16. A method executed in an electronic entity in order to exchange data with a data processing system, comprising:
personalizing by storing in the electronic memory a secret asymmetrical key of a pair of asymmetrical keys;
sending the data processing system a certificate associating an identifier of the electronic entity with a public asymmetrical key associated with the secret asymmetrical key stored in the electronic entity from a set of reserved keys associated with a first security domain; and
an application of the electronic entity separate from the first security domain and the data processing system exchanging data comprising a plurality of symmetric keys respectively encrypted by means of said public asymmetrical key or signed by the first security domain using the secret asymmetrical key stored in the electronic entity to produce encrypted keys, the application receiving the encrypted keys by means of a temporary key set such that the application uses only symmetrical cryptography and thus has no recourse to asymmetrical cryptography; and
the secret asymmetrical key decrypting the plurality of symmetric keys and sending the decrypted plurality of symmetric keys to the application to enable personalization of the application.

17. The method according to claim 16, further comprising:
mutual authentication utilizing a first symmetrical key;
protecting confidentiality of exchanges utilizing a second symmetrical key; and
protecting integrity of exchanges utilizing a third symmetrical key.

18. A method executed in a data processing system in order to exchange data with an electronic entity, comprising:
personalizing by storing in the electronic memory a secret asymmetrical key of a pair of asymmetrical keys;
receiving from the electronic entity a certificate associating an identifier of the electronic entity with a public asymmetrical key associated with the secret key stored in the electronic entity from a set of reserved keys associated with a first security domain;
verifying by means of the certificate the association of said identifier and the public asymmetrical key;
an application of the electronic entity separate from the first security domain and the data processing system exchanging data comprising a plurality of symmetric keys encrypted by means of said public asymmetrical key or signed by the first security domain by means of the secret asymmetrical key stored in the electronic entity to produce encrypted keys, the application receiving the encrypted keys by means of a temporary key set such that the application uses only symmetrical cryptography and thus has no recourse to asymmetrical cryptography; and
the secret asymmetrical key decrypting the plurality of symmetric keys and sending the decrypted plurality of symmetric keys to the application to enable personalization of the application.

19. The method according to claim 18, further comprising:
mutual authentication utilizing a first symmetrical key;
protecting confidentiality of exchanges utilizing a second symmetrical key; and
protecting integrity of exchanges utilizing a third symmetrical key.

* * * * *